United States Patent [19]

Barehas

[11] 4,103,053

[45] Jul. 25, 1978

[54] PRESSURE SENSITIVE LAMINATE AND METHOD OF FORMING SAME

[76] Inventor: Myron Barehas, 280 First Ave., New York, N.Y. 10009

[21] Appl. No.: 675,648

[22] Filed: Apr. 9, 1976

[51] Int. Cl.$^2$ .......................... B32B 3/24; B32B 3/30; B32B 5/18

[52] U.S. Cl. ...................................... 428/40; 156/219; 156/234; 156/240; 282/27.5; 427/146; 427/153; 428/86; 428/87; 428/90; 428/119; 428/161; 428/172; 428/202; 428/204; 428/207; 428/307; 428/310; 428/138; 428/323; 428/913; 428/914; 428/247

[58] Field of Search ...................... 428/40, 42, 914, 86, 428/119, 120, 87, 173, 161, 166, 913, 202, 138, 247, 204, 411, 323, 327, 172, 207, 306, 307, 90, 91, 310; 427/146, 153, 152; 282/27.5; 156/239, 240, 234, 219

[56] References Cited

U.S. PATENT DOCUMENTS

| | | | |
|---|---|---|---|
| 2,655,453 | 10/1953 | Sandberg | 428/914 |
| 3,331,729 | 7/1967 | Danielson et al. | 428/40 |
| 3,467,539 | 9/1969 | Schlotzhauer et al. | 428/914 |
| 3,592,722 | 7/1971 | Morgan | 428/202 |
| 3,635,746 | 1/1972 | Karlan | 156/234 |
| 3,669,713 | 6/1972 | Neuman | 428/914 |
| 3,708,323 | 1/1973 | Stroble | 428/914 |
| 3,900,633 | 8/1975 | Piron | 428/42 |
| 3,974,311 | 8/1976 | Cherrin | 428/204 |

*Primary Examiner*—George F. Lesmes
*Assistant Examiner*—Stanley S. Silverman
*Attorney, Agent, or Firm*—Arthur T. Fattibene

[57] ABSTRACT

A pressure sensitive laminate and method of making same for effecting an image transfer and attachment which includes a carrier layer having releasably bonded thereto a coloring pigment or dye, and a complementary adhesively backed laminate which is normally maintained in spaced relationship by a spacer interposed between the carrier and covering layers whereby the transfer is effected by applying a predetermined pressure for bringing the adhesive backed layer into intimate contact with the releasable pigment of the carrier layer in the area of applied pressure only. Upon stripping the covering layer from the carrier layer with the pigment adhered thereto along the area of intimate contact, the covering layer can be readily applied to a given surface.

14 Claims, 12 Drawing Figures

PRESSURE SENSITIVE LAMINATE AND METHOD OF FORMING SAME

FIELD OF INVENTION

This invention relates to a device and process whereby images can be readily formed by a transfer process upon the application of a predetermined pressure which is generally greater then normal handling pressures of the device. It is frequently desirable to have labels made for identifying various subject matters. Heretofore, various printing and/or embossing devices having been made whereby a user may readily make or point his own label or sign. Such a device is one known under the tradename Dymo. Other similar devices are also known. Labels made by such devices are formed by embossing pring on a relatively thick strip of material which is then adhered to a given surface. Labels so formed have no protective covering for the embossed images so formed. Frequently it is difficult to adhere such labels to certain types of surfaces, and more specifically, to curved and/or compounded curved surfaces and/or to rough or uneven surfaces. As the print or image is not protected from the environment, such print is subjected to the wear and tear of the elements. Also the nature and appearance of a label so formed does not give an appearance of being an integral part of the surface to which it is adhered, and therefore, tends to detract from the object or surface to which it is attached.

With the prior embossing method, the lettering was limited to relatively thin lined letters; and as such, relatively wide printing fonts with high contrast were not feasible.

OBJECTS

An object of this invention is to provide an improved labelling laminate by which various images can be readily formed onto a relatively thin substrate by a transfer process.

Another object is to provide a labelling laminate whereby the transferred image can be readily attached to a given surface in a manner whereby the image is protected from the environment.

Another object is to provide for a self-adhereing label or the like which will adhere to a given surface only upon the application of a predetermined force.

Another object is to provide an improved transfer system or method by which images are formed and transferred by the application of pressure.

Another object is to provide an improved labeling laminate wherein images of high contrast can be readily formed.

BRIEF SUMMARY OF INVENTION

The foregoing objects and other features and advantages are attained by a pressure sensitive laminate which includes a carrier layer which has a pigmented coating or ink releasably connected to the carrier layer, and which coating is covered by an adhesively backed covering layer. A spacer is disposed between the carrier layer and the covering layer so as to normally maintain the adhesive back of the covering layer out of contact with the pigmented coating of the carrier layer. The arrangement is such that when a predetermined pressure is applied to the laminate spaced layers, the adhesive backed portion of the covering layer is brought into intimate contact with the releaseable coating of pigment on the carrier layer throughout the area of intimate contact therebetween. Upon separation of the respective layers, the pigment adhered to the adhesive backing is removed from the carrier layer whereupon the adhesive backed covering material with the transferred image thereon can be readily applied to a given surface. In accordance with this invention various types of spacers can be interposed between the carrier layer and covering layer to normally maintain the respective layers spaced apart during normal handling and which one layer will deform upon the application of a force or pressure to effect a transfer.

FEATURES

A feature of this invention resides in the provision of effecting an image transfer to the adhesive side of a cellophane tape.

Another feature of this invention resides in the provision of forming an image transfer onto the adhesive side of a sheet material by the application of pressure only.

Another feature of this invention resides in the provision of a laminated transfer system wherein the laminates are maintained in slightly spaced relationship until the transfer is effected.

Other features and advantages will become more apparent when considered in view of the drawings and description in which.

DETAILED DESCRIPTION

Figure 3:
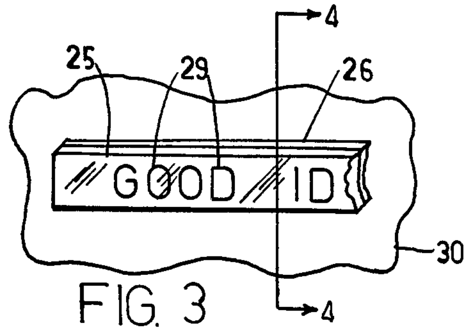
FIG. 3 is a plan view illustrating the pressure sensitive laminate in use as applied to a surface.
Figure 4:
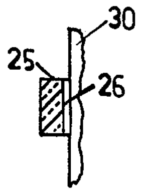
FIG. 4 is a sectional view taken along line 4—4 on FIG. 3.
Figure 2:
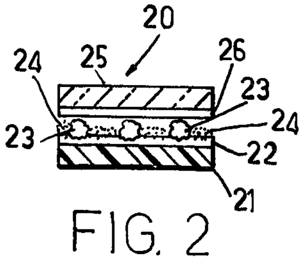
FIG. 2 is an end sectional view taken along line 2—2 on FIG. 1.
Figure 1:
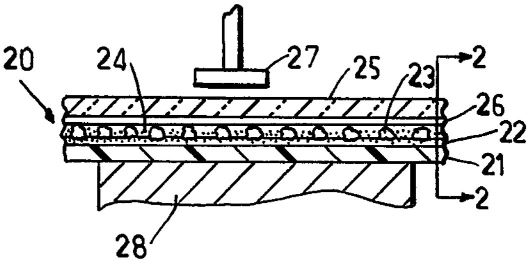
FIG. 1 is a side sectional elevation view of a self-adhering laminate embodying the invention.

Referring to the drawings, and more specifically to FIGS. 1 through 4, there is shown therein a pressure sensitive laminate 20 embodying the present invention. For purposes of illustration, the proportion of the laminates are exaggerated. As shown, the pressure sensitive laminate comprises a carrier layer 21 to which there is bonded to one surface thereof by a suitable adhesive 22 a plurality of particles or grits 23 to provide spacer elements as will be hereinafter described. Such carrier layer may comprise sandpaper, emory cloth and the like. The particle surface of the carrier layer 21 is covered with a layer of coloring pigment 24, e.g., powdered charcoal, graphite, or other suitable printing type pigment or ink. Thus the layer of charcoal or coloring pigment 24 is disposed onto the carrier layer 21 so as to be disposed in the valleys or voids defined between adjacent particles 23. Any excess of the charcoal, graphite or coloring pigment 24 is brushed off the tops of the particles or spacers 23 so that the tops or ends of the particles 23 extend above the coloring layer of pigment, charcoal or graphite. Thus the peaks or top surfaces of the particles 23 are free of any coloring pigment or charcoal as the coloring pigment is confined in the valleys or spaces defined between the particles.

A transparent covering layer 25, e.g., cellophane tape or sheet of material is applied over the tops of the particles 23. The covering layer has an adhesive coating or layer 26 on the back thereof which normally rests on the peaks or tops of particles 23. Thus the adhesive backing of the cellophane tape is not normally in contact with the graphite, charcoal, or pigmented coloring layer 24 which occupies the valleys between the particles 23. The laminate 20 thus described can be readily rolled into a roll and be subjected to ordinary handling without causing the adhesive backing 26 of the covering layer 25 to contact the layer of coloring pigment 24, which is releaseably held to the carrier layer 21 between or in the valleys defined by the particles 23.

In accordance with this invention, an image transfer is effected by applying a predetermined pressure or force on the laminate 20 so as to effect the displacement of the covering layer 25 so as to bring it into intimate contact with the coloring layer 24 disposed in the valleys between the particles. This can be readily attained by applying the pressure mechanically, e.g., by means of a die or printing font 27. By disposing a platen 28 below the carrier layer 21, and by bringing a die or printing font 27 under pressure onto the covering layer 25, the adhesive back 26 of the covering layer 25 is forced into intimate contact with the coloring layer 24 of the carrier layer 21 in the area of the intimate contact. When this occurs, the coloring pigment is released from the carrier layer and adheres to the adhesive backing 26 of the covering layer 25 to define a given image 29, since the adhesive of the covering material is selected so as to be stronger than that adhesive releaseably securing the coloring layer 24 to the carrier layer 21. Thereafter the cover layer 25 can be stripped from the carrier layer 21 with the coloring pigment adhered to the adhesive backing of the covering material in accordance with the impression 29 made.

With the image thus transferred and formed on the adhesive side of the covering layer, the covering layer 25 can then be applied to a given surface 30 so that the image 29 can be fixedly secured to a given surface, which image is rendered readily visible through the transparent covering layer or cellophane tape 25. The described laminate 20 can be used to form or print various labels and/or other printed or pictorial matter directly onto an adhesive back material by pressure sensitive transfer method, and thereafter applied to a given surface 30 so that the image 29 thus transferred is protected from the surrounding environment. Because the imprint is done on relatively thin cellophane type sheet material, which is adhesively backed, the cellophane sheet can be readily applied to irregular surfaces and/or can be stretched to provide a neat and pleasing appearance whereby the image 29 appears to be an integral part of the identified surface or object 30.

To minimize problems of static and other undesirable or unintentional transfer of the coloring pigment 24 from the carrier layer 21 to the adhesive backing 26 of the covering material or cellophane tape 25, the coloring pigment 24 can be coated onto the carrier layer with an adhesive which will releaseably maintain the pigment to the carrier layer until a sufficient pressure has been applied to the covering material 25 to force the adhesive backing 26 thereof into intimate contact with the coloring layer of pigment, whereby the pigment is released as the covering material 25 is stripped from the carrier layer 21.

A pressure sensitive transfer laminate 20 herein described may be formed first by spraying the carrier layer 21 with a strong adhesive, and thereafter apply the particles. The adhesive is sufficient to bond the particles 23 thereto. When the bonding adhesive 22 of the particles 23 is only partially cured, thereby leaving it weakly tacky, the coloring pigment is applied over the surface so that the pigment is releaseably held to the partially cured adhesive only. It will be understood that the size, shape, density, distribution and the nature of the particles will have an effect on the fidelity of the image. Accordingly, such factors are taken into consideration in determining the desired end result of the type of image to be formed.

With the pressure sensitive laminate 20 described, it will be noted that the transfer or forming of an image can be readily effected by the application of a pressure exerted between a die member or ptinting font 27 and a platen 28, the hardness of which may be chosen to given an optimum image transfer quality.

It will be understood that the carrier layer 21 may be formed of any suitable material, e.g., paper, plastic, fabric and the like. The covering layer 25 may also be formed of a paper, plastic or fabric material. In the described form of the invention, the particles 23 bonded to the carrier layer 21 define spacer means or elements which will normally maintain the adhesive backing of the covering layer 25 out of contact with the coloring pigment 24 until such time that a predetermined pressure is applied so as to effect the displacement of the covering material 25 so as to bring the adhesive back surface 26 thereof into intimate contact with the coloring pigment 24 in accordance with the area of applied pressure.

Figure 5:
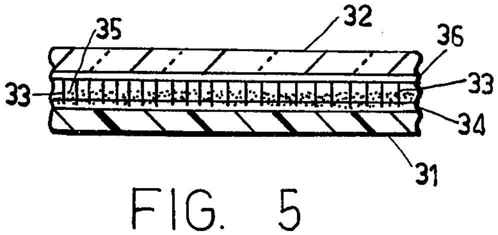
FIG. 5 is a sectional view of a modified embodiment.

FIG. 5 illustrates a modified form of the invention. In this form of the invention, the spacing element between the carrier layer 31 and the covering layer 32 comprises very fine short lengths of fibres 33 which are commercially referred to as flocking. In this form of the invention, the flocking 33 is layed on the carrier layer 31 in an erect or perpendicular orientation with respect to the carrier layer 31. This perpendicular orientation of the relatively short flock fibres 33 can be effected electrostatically. The flock fibres 33 are bonded perpendicularly to the carrier layer by an adhesive layer 34. The coloring pigment 35 is thereafter interspaced between the flocking fibres on the adhesive layer 34 in a manner whereby the thickness of the coloring layer is less than the height of the flocking fibres 33. The covering layer 32 is thereafter placed over the upper ends of the flocking fibres 33. The flocking fibres 33 function to normally maintain the adhesive backing 36 of the covering layer 32 spaced above the surface of the coloring pigment layer 35, which is releaseably bonded to the carrier layer 31 between the flocking fibres. The adhesive back 36 of the covering material or layer 32 is weakly adhered to the upper ends of the flocking fibres 33 thereby forming a laminate comprising a carrier layer 31, a covering layer 32 and a releaseable coloring layer 35 wherein the adhesive backing of the covering layer 32 is slightly spaced from the coloring pigmented layer 35, until a transfer pressure is applied. Accordingly, the laminate so formed can be rolled onto a spool or roll and dispensed in a manner similar to ordinary tape.

However, when a pressure greater than normal handling pressure is applied to the laminate construction as described with respect to FIG. 5, the application of pressure in excess of normal handling pressure causes the displacement of the covering layer 32 into intimate contact with the pigmented layer 35 whereby the pigmented layer will adhere to the adhesive backing of the covering layer 32 where such contact has been made. Upon the stripping of the covering layer 32, as hereinbefore described, from the carrier layer 31, the image coincident with the area of applied pressure is transferred onto the covering material. Upon separation of the covering material, it can then be applied and adhesively secured to a given surface whereby the image is protected by the covering layer and rendered visible therethrough. It will be understood that when the pressure is applied to effect the image transfer, that the flock fibres 33, being flexible, will bend so as to enable the adhesive backing of the covering material 32 to make contact with the layer of color pigment to effect the image transfer.

With the construction of FIG. 5, it will be noted that the pressure at which the image is transferred can be controlled by adjusting the density and/or pattern of distribution of the flocking fibres 33. Also, the amount of pressure required can be controlled by taking into consideration the length, diameter, nature, composition, and bending strength of the respective flocking fibres 33.

Figure 6:
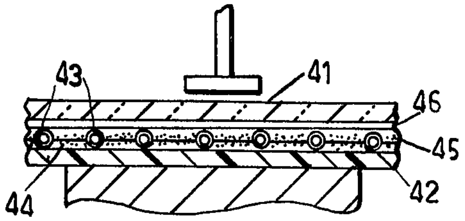
FIG. 6 is a sectional view of another modified embodiment.

FIG. 6 illustrates another form of the invention. In this form of the invention the spacing elements for maintaining the covering layer 41 normally spaced from the pigmented layer 45, which is releaseably bonded to the carrier layer 42, comprises a series of micro-capsules 43. The micro-capsules 43 are distributed on the carrier layer 42 and are suitably bonded thereto by a layer of adhesive 44. The micro-capsules 43 comprise hollow bodies of minute size formed of a crushable material. The arrangement is such that the microcapsules will normally prevent the adhesive backing 46 of the covering layer 41 contacting the pigmented layer 45 dispersed in the voids or spaces between the microcapsules 43.

An an alternate construction, the microcapsules 43 may be filled with an adhesive so that when the pressure is applied to the covering layer 41 for effecting the image transfer, the microcapsules where the pressure is applied are crushed thereby releasing the adhesive contained therein. The released adhesive functions to enhance the bond effected between the coloring pigment 45 and the adhesive back of the cover layer 41 to result in a more positive color transfer as the convering laminate 41 is pulled or separated from the carrier layer 42. In such instances, the adhesive may be an active one, or it may consist of a component or one part of a two part adhesive system, in which case, the other adhesive component having been previously coated onto the carrier layer 42 for releaseably securing the color layer 45 to it. Conversely the second part of such two part system may be coated on the adhesive backing 46 of the covering layer 41.

In all other respects the construction and operation of the pressure sensitive laminate of FIG. 6 is similar to that hereinbefore described.

Figure 7:
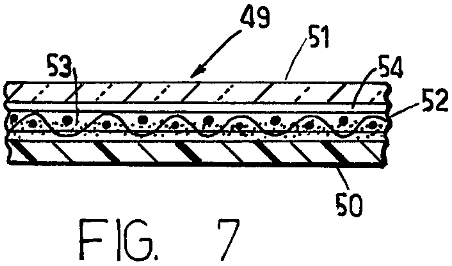
FIG. 7 is a sectional view of another modified embodiment.

In another form of the invention, as shown in FIG. 7, the spacing element between the carrier layer 50 and the covering layer 51 may comprise a fine mesh or screen 52. In this embodiment, the pigment layer 53 is composed of a medium which will flow under moderate pressure and which is adhesively and releaseably secured to the carrier layer. Thus when pressure is exerted against the laminate, as shown in FIG. 7, the ink or pigment layer 53 will flow up through the screen aperatures where the adhesive backing 54 of the covering layer 51 will pick up the coloring pigment to effect an exact reproduction of the image defined by the pattern of the applied pressure, to result in an image much like that produced by silk screen printing.

In all other respects the construction and operation of the pressure sensitive laminate 49 of FIG. 7 is similar to that hereinbefore described.

Figure 8:
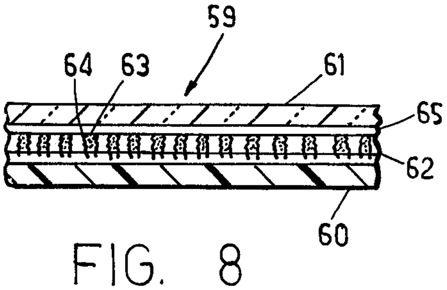
FIG. 8 is a sectional view of another embodiment.

FIG. 8 illustrates another modified form of the invention. In this form of the invention, the spacing elements between the carrier 60 and the covering layer 61 comprises a rubbery or deformable matrix 62 which is micro porous, and which pores are filled with the pigmentation or printing ink composition 63 which will flow out of the pores 64 when pressure has been applied to the laminated construction 59 of FIG. 8. It will be understood that upon the application of a predetermined pressure, the adhesive backing 65 of the covering layer 61 is brought into intimate contact with the pores of the micro porous spacer 63 so that the pigment contained in the pores thereof is released and adhered to the adhesive backing of the covering layer in accordance with the area of intimate contact therebetween. Thus, when the covering layer 61 is stripped from the carrier layer 60 and its connected micro porous spacing elements 62, the image transferred thereby is removed. Thus the covering layer 61 with the image so formed thereon can be readily applied to a given surface in a manner similar to that of ordinary cellophane tape; with the image being fully protected by the covering layer.

It will be understood that the micro porous spacer 62 may be also formed of a rigid material, and the pores 64 thereof being filled with a coloring pigment 63 as hereinbefore described. Where a rigid micro-proous spacer is utilized, the transfer is effected by the adhesive backing of the covering layer 61 being deformed so as to penetrate into the pores 64 to pick up the coloring pigment contained therein. Whether the spacer element 62 is a flexible porous member or a rigid porous member, the end result is similar. It will be understood that the spacers be something other than fibres 82 or embossments 85. They may also take the spacer forms as defined with respect to FIGS. 1 to 6.

Figure 9:
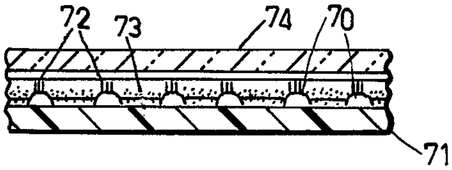
FIG. 9 is a sectional view of another embodiment.

FIG. 9 illustrates another embodiment of the present invention. As shown in FIG. 9, the bonding adhesive or glue 70 is applied to an uncoated carrier layer 71 through a screen which has holes of relatively small size separated from each other by a relatively large distance. In this manner, a pattern of minute glue spots 70 are produced on the carrier layer 71. In accordance with this embodiment, flocking fibres 72 or other spacing means are applied to the glue spots 70 to extend normal thereto. The pigment dispersed in a thermo-plastic powder 73 is electrostatically applied over the carrier layer 71. Thus the pigmented layer 73 dispersed in the plastic powder adheres only in the areas of the carrier layer where the flocking 72 of spacing means has not been applied. The coloring pigment 73 dispersed in the thermo plastic powder is thereafter releaseably fused to the carrier layer 71, e.g., by infrared light or heat. The arrangement is such that the coloring pigment 73 is thus releaseably bonded between the flocking material or spacers 72 to the carrier layer 71. An adhesive back covering layer 74, similar to that hereinbefore described, is disposed in contact with the extended ends of the flocking fibres 72. In this arrangement, the image transfer is effected by applying pressure to the laminate structure described so as to bring the adhesive backing of the covering layer 74 into intimate contact with the pigmented layer 73.

An alternate construction of making a laminate embodying the present invention is to apply to the surface of the carrier layer a resin or glue which becomes only lightly tacky when heated. On top of this layer, a pattern of glue spots is applied through an appropriate screen or mesh as hereinabove described. The flocking fibres can then be applied and adhered to the glue spots only.

The exposed areas of the heat sensitive glue which is rendered tacky by heating is then covered with the suitable pigment layer which may be electrostatically applied. The color thus applied will adhere in a releaseable manner to the slightly tacky glue areas of the carrier layer.

In all other respects the function and construction is similar to that described hereinable.

From the foregoing described embodiments, it will be noted that the laminate structure described provides various means of keeping two normally reactive materials or layers in contiguous relationship in a manner so as to prohibit reaction therebetween until a sufficient pressure has been applied thereto so as to bring the reactive layers into actual intimate contact with one another. Upon the image transfer being effected in accordance with the area of intimate contact, the covering layer can be stripped from the carrier layer, and applied to a given surface with the secured image protected thereby.

Figure 10:
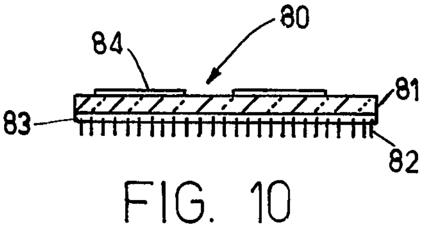
FIG. 10 is a sectional view of a pressure sensitive laminate.

FIG. 10 illustrates a pressure sensitive layer 80 which can be readily applied to any given surface. As shown in FIG. 10, the label comprises a backing material 81 which has suitable indicia 84 thereon. The back or one side of the material 81 is then coated with a suitable pressure senstive adhesive 83 to which a series of flocking fibres 82 are bonded. The arrangement is such that the adhesive is pressure sensitive so that the label 81 can be readily applied to a surface when sufficient pressure has been applied thereto. The arrangement is such that the exposed ends of the flocking fibres 82 are such that the backing of the label is essentially non-tacky to the touch. However, when pressure is applied, the flock fibres 82 are displaced causing the adhesive to adhere to any surface brought in contact therewith. Thus the label of FIG. 10 is rendered adhesive to an adjacent surface only when sufficient pressure is applied to effect the displacement of the flock fibres 82. Under normal conditions, the flocking will prohibit the label from being adhered to any surface. Thus the pressure sensitive tape with the flocking backing as described with respect to FIG. 10 can have application in those areas where it is desireable to adhere a tape or other object to a given surface merely by the application of pressure thereto, and which under normal circumstances is prevented from adhereing to such surface until such sufficient pressure is applied thereto.

Figure 11:
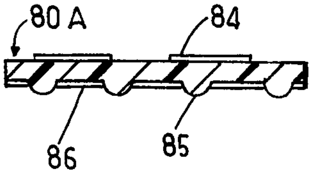
FIG. 11 is a sectional view of another modified embodiment.

In another form of the invention the pressure sensitive layer 80A of FIG. 11 may be formed with spacers 85 which are formed as embossments; i.e., the material of the layer 80A is formed or pressed out of the plane thereof as protrusions. Thus as seen in FIG. 11, the protrusions 85 extend beyond the surface of the adhesive layer 86. Thus when the adhesive coating is placed face down against a surface, the protrusions will normally maintain the adhesive layer spaced from the surface until a pressure is exerted on layer 80A sufficient to deform the protrusions. Therefore, the protrusions are constructed so as to resist normal handling pressure, but will deform when a predetermined force is applied thereto.

Figure 12:
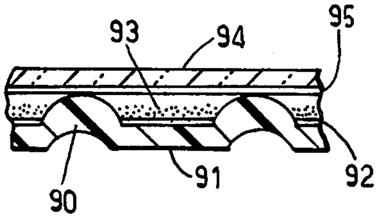
FIG. 12 is a sectional view of another modified embodiment.

In FIG. 12, embossment or protrusion 90 may also function as spacers in transfer laminate, wherein the protrusions are formed integral with the carrier layer 91 wherein the adhesive layer 92 and coloring pigment 93 are dispersed between the voids defined by such protrusions or embossments 90. The covering layer 94 with adhesive backing 95 is disposed so as to engage the top of the protrusions or embossments 90. Thus as hereinbefore described when an applied force is imparted to the laminate; the covering layer 94 is deformed so that the adhesive backing 95 engages the coloring pigment 93 only in the area of the applied force so as to effect a transfer of the pigment from the carrier 91 to the covering layer 94 as hereinbefore described.

While the present invention is described with respect to various embodiments thereof, it will be readily appreciated and understood that variations and modifications may be made without departing from the spirit or scope of the invention.

What is claimed is:

1. A labelling laminate comprising:

a carrier layer a pigmenting layer adhesively connected to one side of said carrier layer, a transparent, adhesively backed, covering layer which is aggressively adhesive on one side thereof, over substantially the entire area thereof, and spacing means disposed on said one side of said carrier layer and between said one side and said adhesive side of said covering layer for normally maintaining said one side of said carrier layer and said adhesive side of said covering layer in slightly spaced apart relationship so that the application of a predetermined pressure on said layers causes said adhesive side of said covering layer to be disposed into intimate contact with said pigmenting means permitting said pigmenting means to adhere to said adhesive side of said covering layer in the area of intimate contact therebetween and rendered releaseable therewith when said covering layer is stripped from said carrier layer whereby said covering layer can thereafter be adhesively secured as a label to an article.

2. The invention as defined in claim 1 wherein said covering layer is Cellophane tape.

3. The invention as defined in claim 1 wherein said spacing means includes a plurality of flocking fibres that are perpendicularly oriented relative to said layers and said pigmenting means being interposed between said fibres.

4. The invention as defined in claim 1 wherein said spacing means comprises a screen mesh.

5. The invention as defined in claim 1 wherein said spacing means comprises a microporous layer of material, and said pigmenting means being dispersed in the pores of said microporous layer.

6. The invention as defined in claim 1 wherein said spacing means comprises particles.

7. The invention as defined in claim 1 wherein said pigmenting means comprises carbon powder releaseably bonded to said carrier layer between said spacing means.

8. The invention as defined in claim 1 wherein said pigmenting means includes printing ink.

9. The invention as defined in claim 1 wherein said spacing means comprises a plurality of readily crushable hollow microcapsules.

10. The invention as defined in claim 9 wherein said microcapsules are filled with an adhesive.

11. A transfer laminate comprising:

a first layer, a readily transferable color layer releaseably connected to said first layer, a spacer means connected to said first layer, said spacer means having end portions which extend slightly above the layer of said transferable color, a second transparent layer, said second transparent layer having a layer of active pressure sensitive adhesive disposed on the entire area of one side thereof, said adhesive side of said second layer being contiguously disposed relative to the extended end portions of said spacer means whereby said one side of said adhesive layer is normally spaced from said color layer, and said second layer when subjected to a predetermined force is deformable so as to be placed into intimate contact with said color layer whereby the releaseable color layer adheres to said one side of said second layer in accordance to the area of intimate contact between said second layer and said color layer, said second layer being readily releaseably secured to said spacer means so as to be stripped therefrom with the releaseable color adhered thereto, and whereby said one side of said second layer with said color adhered thereto can be readily adhesively secured to a supporting surface whereby said adhered color is disposed against the supporting surface and readily visible through said transparent layer.

12. The invention as defined in claim 11 wherein said spacer means comprises an embossed pattern of deformable material formed on at least one of said first and second layers whereby said embossed pattern normally maintains said second layer spaced from said color layer.

13. A method of making a pressure sensitive transfer laminate comprising the steps of:

bonding spacer elements to a substrate laminate, releaseably bonding a pigment coating to said substrate between said spacer elements whereby the thickness of said pigmented coating is less than the thickness of said spacer elements, disposing a transparent covering layer having one surface thereof entirely coated with a layer of adhesive onto said spacer elements so that said adhesive contacts said spacer elements whereby the adhesive surface of said covering layer is normally spaced from said pigment coating.

applying a predetermined amount of pressure onto said layers whereby the adhesive backed layer is pressed into intimate contact with said pigment coating in the area of said applied pressure, and separating said transparent covering layer whereby the portion of the pigmented coating in contact with the adhesive back of said covering layer is removed therewith, and adhereing said separated layer to a supporting surface whereby the adhered pigmented coating is rendered readily visible through said transparent covering layer.

14. A method of making a pressure sensitive transfer laminate comprising the step of forming a substrate laminate with a series of embossments, releaseably bonding a coloring pigment to said substrate in the voids defined by said embossments whereby the embossments extend beyond the surface of said coloring pigment, disposing a laminate having one side entirely coated with an adhesive layer onto said embossments so that said adhesive contacts said embossments whereby the adhesive layer of said laminate is normally spaced from said coloring pigment.

* * * * *

UNITED STATES PATENT OFFICE

CERTIFICATE OF CORRECTION

Patent No. 4,103,053 Dated July 25, 1978

Inventor(s) Myron Barchas

It is certified that error appears in the above-identified patent and that said Letters Patent are hereby corrected as shown below:

On the cover sheet Item (76) inventor should read:

-- Myron Barchas --.

Signed and Sealed this

*Sixth* Day of *February 1979*

[SEAL]

*Attest:*

RUTH C. MASON
*Attesting Officer*

DONALD W. BANNER
*Commissioner of Patents and Trademarks*